March 6, 1934.  H. SCHÖNEBORN  1,949,696
APPARATUS FOR WASHING LIQUIDS INSOLUBLE IN EACH OTHER
Filed Jan. 30, 1932  2 Sheets-Sheet 1

Inventor:
Heinrich Schöneborn
By Henry Love Clarke
his atty

March 6, 1934. H. SCHÖNEBORN 1,949,696
APPARATUS FOR WASHING LIQUIDS INSOLUBLE IN EACH OTHER
Filed Jan. 30, 1932 2 Sheets-Sheet 2

Inventor:
Heinrich Schöneborn,
By Henry Lyon Clarke
his atty.

Patented Mar. 6, 1934

1,949,696

UNITED STATES PATENT OFFICE 1,949,696

APPARATUS FOR WASHING LIQUIDS INSOLUBLE IN EACH OTHER

Heinrich Schöneborn, Kettwig - on - the - Ruhr, Germany, assignor, by mesne assignments, to The Koppers Company of Delaware, Pittsburgh, Pa., a corporation of Delaware Application January 30, 1932, Serial No. 589,919
In Germany March 5, 1930

9 Claims. (Cl. 259—96)

The present invention relates to apparatus for washing with one another two or more liquids of different specific weight which are insoluble in each other, and more particularly to apparatus for washing liquids with one another wherein the liquids are mixed together by means of a mechanically driven agitator and moved in counter-current to each other.

The effectiveness of such apparatus for washing two or more liquids which are not soluble in each other depends in the main upon the size of the surface over which the two liquids come into contact with each other. An example of washing one liquid with another is the treatment of phenol-containing ammonia water with benzene or another organic solvent for the purpose of removing the phenol and its homologues from the ammonia water. It is known that in such treatment of the impure ammonia wafer the removal of the phenol is more complete and efficient the more intimately the solvent is mixed with the ammonia water, i. e. the greater the surface is between the solvent and the ammonia water.

Various means have already been proposed for increasing the surface between the liquids. According to one suggestion the two liquids are introduced from above or below into a high, relatively narrow washing tower from which the specifically lighter liquid is withdrawn at the upper end and the specifically heavier at the lower end, after the two liquids have been very thoroughly mixed with each other inside the tower by means of an agitator provided with stirring blades or vanes. In another known apparatus for washing one liquid with another liquid which is insoluble in the first, horizontal or approximately horizontal perforated plates are provided, in the interior of the washing tower on or beneath which one of the liquids is dammed up in such a manner that it permeates through the other liquid in the form of a more or less fine shower. In all these known apparatus however, the surface between the two liquids is still relatively small. The apparatus must therefore be fairly large in order to obtain a good washing, and the quantity of solvent used for washing must also as a rule be very great. Thus for instance when using the known washing apparatus for dephenolizing ammonia water by means of benzene it is necessary to keep about 85-95% benzene in circulation in the apparatus for each unit of volume of the water being treated.

My present invention has for its object to provide an improved apparatus for washing two or more liquids of different specific weight which are insoluble in each other, whereby the liquids are brought into contact with each other over a considerably larger surface than in the apparatus known heretofore, so that a far more effective washing action is obtained.

The apparatus invented by me consists in its simplest form of a chamber in which an agitating member is mounted to rotate about a vertical or approximately vertical axis, the said agitating member consisting essentially of a disc-like body from whose upper and lower sides proceed channels which unite at or near the edge of the disc element. The chamber is also provided with means for introducing one, preferably the specifically lighter, liquid beneath the agitating member, and the other, preferably the specifically heavier, liquid above the agitating member and for withdrawing the liquids from the chamber. If for instance, my new apparatus is used for washing phenol-containing ammonia water with benzene first of all the agitating element is set in rotation and then the impure ammonia water is introduced into the washing chamber from above and benzene from below. Inside the chamber the ammonia water is drawn into the channels proceeding from the upper side of the agitating element and the benzene into the channels proceeding from the lower side of the agitatin element owing to the rotation of the said agitator and are flung off at the edge of the agitator through the common opening by centrifugal force, whereby the two liquids become intimately mixed together. As it travels further away from the agitator the liquid mixture slackens its speed, and the two liquids separate from each other again. The specifically lighter liquid rises to the top of the washing chamber, whilst the specifically heavier falls to the bottom of the chamber. This separation of the two liquids takes place even when the chamber is completely filled with liquid. Finally the lighter liquid is drawn off at the top of the chamber and the heavier liquid at the bottom.

In the washing apparatus according to my present invention I also provide means for introducing the one and withdrawing the other liquid into or out of the chamber through the same opening without disturbing the flow of the two liquids.

I also prefer to provide the washing chamber with means for substantially preventing rotation of the liquid inside the chamber and for ensuring a rapid and complete separation of the two liquids from each other.

The final object of my invention is to provide an improved washing apparatus having a number of washing chambers each equipped with one or more of the described agitating members and which are so arranged in relation to each other that the liquids pass from one chamber into the next chamber lying above or below it. In this improved apparatus I prefer to mount all the agitating members on a common shaft so that only one drive is necessary for all the agitators. In the last mentioned washing apparatus with a plurality of washing chambers through which liquids flow in succession, a particularly good washing effect is obtained, as described more fully hereafter.

With these and other objects of my invention in view I will now describe the nature of my present invention on the lines of the accompanying drawings, in which Figure 1 is a vertical longitudinal section through a washing apparatus constructed in accordance with the invention, Figure 2 is a vertical section through a part of the apparatus according to the invention on a larger scale.

Figure 1:
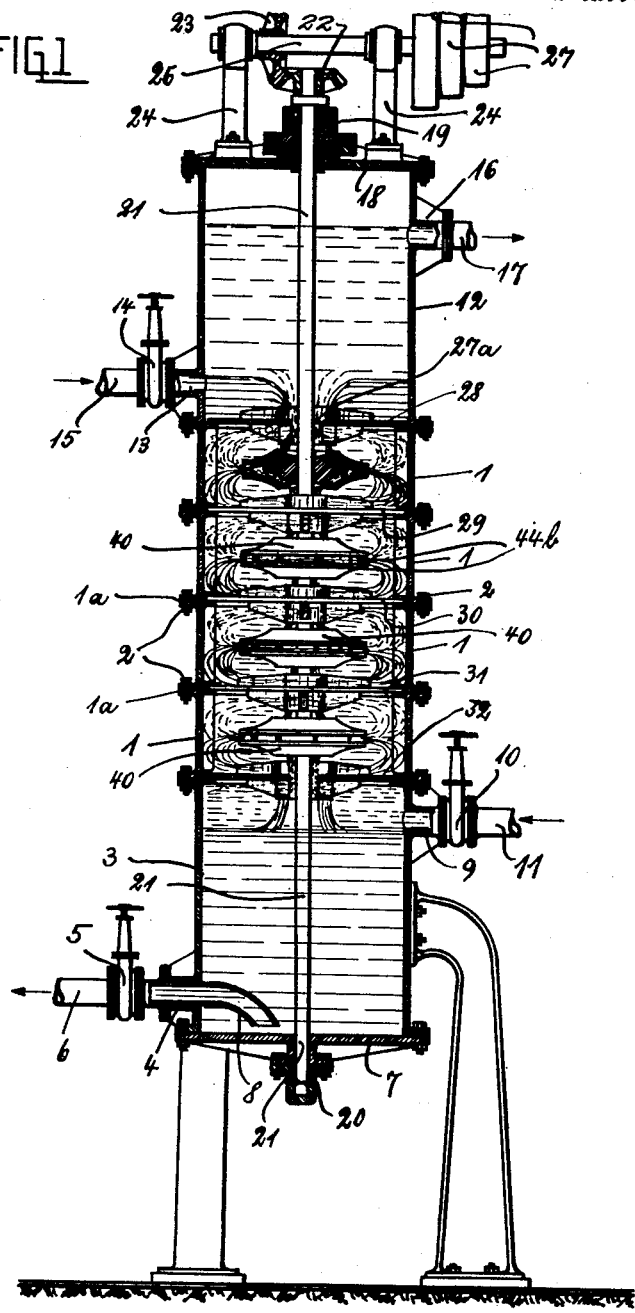

The washer illustrated in the drawings, as an exemplary embodiment of the invention consists of a series of cylindrical sections 1 provided with flanges 1a which are connected together by means of bolts 2. To the lowermost section 1 the bottom section 3 is attached, with whose lateral pipe attachment 4 the pipe 6 controlled by a valve 5 is connected. The pipe attachment 4 has a pipe extension 8 extending into the interior of the bottom section 3 almost to the bottom 7 of same. This pipe extension enables the section 3 to be practically totally emptied.

At the upper end of the section 3 a pipe attachment 9 for the pipe 11 controlled by valve 10 is also provided. The specifically lighter liquid is introduced into the washer through the pipe 11, whilst the specifically heavier liquid is withdrawn from the washer through the pipe 6. The upwardly closed top section of the apparatus is secured to the upper section 1 of the washer and is provided at its lower end with a pipe attachment 13 for a pipe 15 controlled by a valve 14 and at its upper end with an attachment 16 for the pipe 17. Through the pipe 13 the specifically heavier liquid is introduced into the top part 12 of the washer, whilst the specifically lighter liquid is withdrawn from the washer through the attachment 16.

On the cover 18 of the upper section 12 and on the bottom 7 of the lowermost section 3 of the washer, a bearing 19 or 20 is provided for a shaft 21 mounted centrally in the washer. The upper end of this shaft outside the washer carries a bevel wheel 22 in whose cogs a second bevel wheel 23 engages which is carried on one end of a shaft 26 mounted in the bearings 24 and 25 and carrying at its other end belt pulleys 27 on which a driving belt leading to a source of power such as an electro-motor not shown in the drawings can be mounted.

The shaft 21 passes through central apertures 27a in the floors 28, 29, 30, 31, 32, which separate the various sections of the washer from one another. These apertures act at the same time as openings through which the liquids which are to be brought into contact with one another may flow.

The construction of the apertures in the bottoms of the various sections of the washer may be seen in detail in Figure 2, to which reference will now be made.

Figure 2:
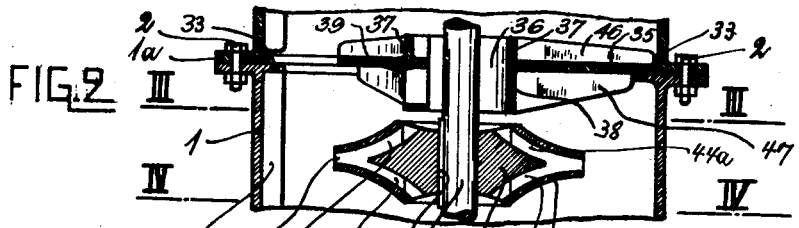
Figure 3:
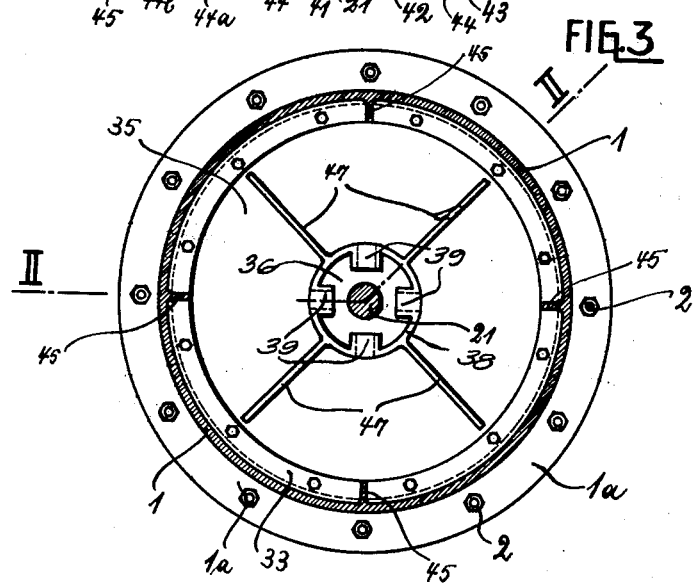
Figure 3 is a horizontal cross section along the line III—III of Fig. 2.

In Figure 2, 21 indicates the central shaft of the washer. On an inner flange 33 of the washer section 1 there rests a partition or floor 35 which has an opening 36 in the middle around the shaft 21. At the edge of this opening the floor 35 has an upward projection 37 and a downward projection 38. The upward projection 37 serves to dam up on the bottom 35 the specifically heavier liquid introduced into the section above the section 1. In the measure as fresh liquid flows into the upper section, the specifically heavier liquid flows over the projection 37 through the opening 36 into the washer section lying beneath.

The lower projection 38 serves to dam up beneath the floor 35 the lighter liquid which is introduced into the section 1 from below. The specifically lighter liquid then floats to a certain extent on the specifically heavier liquid contained in the section 1.

On the projection 38 a number of tubular extensions 39 are provided which open into the aperture 36. The light liquid collecting beneath the floor 35 can escape through these extensions 39 into the aperture 36 and thence into the next higher section of the washer, without hindering the movement of the specifically heavier liquid flowing down from above through the aperture.

For mixing the specifically lighter and the specifically heavier liquids in the individual compartments of the washer agitating elements 40 are provided on the shaft 21, one being provided in each section of the washer, with the exception of the uppermost and lowermost sections. The construction of the elements 40 is particularly illustrated in Figures 2 and 4.

The agitating elements 40 consist of an inner supporting member 42 secured on the shaft 21 by means of a key 41 and a covering member 43 surrounding it. Between the cover member 43 and the supporting member 42 a series of channels 44 are provided, which as shown in Fig. 2 open at the inner side of the agitator approximately beneath the apertures 36 of the floors of the sections. The liquid flowing through the apertures 36 can thus flow into the central openings of the channels 44 and 44a situated above or below them.

Figure 4:
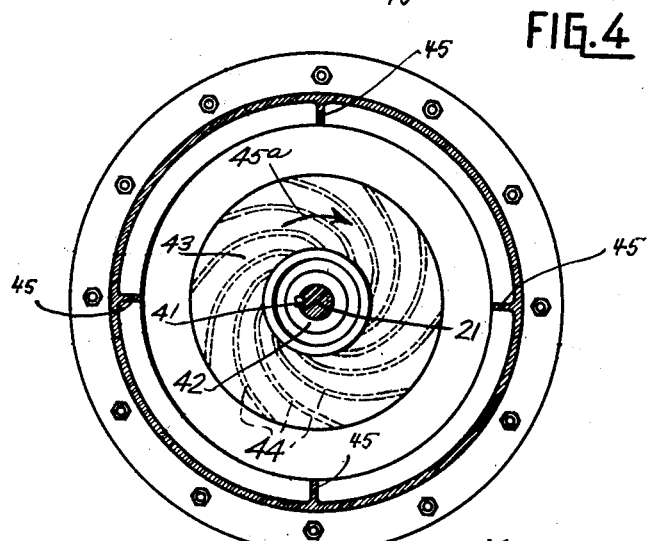
Figure 4 is a similar section along the line IV—IV of Fig. 2.

Externally the channels 44 and 44a merge into slots 44b of the cover 43 and are preferably of a curved form as shown in Fig. 4.

When the shaft 21 and therewith the agitators 40 are rotated in the direction indicated by the arrow 45a in Fig. 4, the liquid contained in the channels 44a and 44 of the agitators is flung out from said channels by centrifugal force and thereby intimately mixed, whilst fresh unmixed liquid flows into the channels 44 and 44a from the washer section lying above and below.

The liquid centrifuged from the channels 44 and 44a of the agitators is flung against the side walls of the washer, whereupon the mixture again separates into a specifically heavier and a specifically lighter portion, the former of which rises to the top of the section while the heavier liquid sinks to the bottom. The two liquids then flow into the next higher or lower sections of the washer.

Owing to the rotation of the agitators the liquid is sometimes caused to move in circles inside the sections of the washer. This circular or rotational movement affects the mixing action of the agitators 40, and it is therefore advisable to provide on the walls of the washer projections 45 running parallel to the shaft 21 which restrict the rotational movement of the liquid. For the same reason it is advantageous to provide upwardly and downwardly extending projections 46 or 47 on the floors 35, also parallel to the shaft 21.

In comparison with the ordinary washers in which the two liquids which are to be brought into contact are only moved in counter current to each other without being submitted a number of times to an intimate mixing operation, the apparatus according to the invention offers the important advantage that a considerably better and more rapid washing can be obtained in a smaller space. Thus for instance when using the apparatus according to the invention for purifying phenol-containing ammonia water by means of benzene the volume of the washer according to the invention need only be about half as large as that of one of the known washers. A further advantage of the invention is that the quantity of solvent used for washing a liquid, for instant the quantity of benzene required for washing phenol from ammonia water can be considerably reduced. For instance for removing phenol from ammonia water in the washers known hitherto about 70% benzene was required, reckoned on the unit of volume of the ammonia water to be purified, whereas when using the washing apparatus according to the invention the quantity of benzene required for purifying the ammonia water can be reduced to about 40 to 45%.

I have particularly described my present invention in a special embodiment, but I do not wish the invention to be restricted to this form of construction. The invention may be embodied in different ways than that herein described. It is also possible to use the washing apparatus according to the invention for other purposes than for washing one liquid with another, for instance, for cooling one fluid with another, or generally for effecting the exchange of heat between two or more liquids. What I claim as my invention is set out in the claims hereinafter made.

I claim:

1. An apparatus for bringing into contact with each other liquids of different specific weight which are practically insoluble in each other, comprising a chamber, an agitating element mounted therein to rotate about a substantially vertical axis, means for rotating this agitator in the chamber, said agitator being provided with channels proceeding from the upper side and the lower side of same and ending substantially at the periphery of said agitator, the mouths of the channels on the upper and lower sides being nearer the axis of the agitator than the channels at the periphery of same, means for introducing the specifically lighter and the specifically heavier liquid into the chamber below and above said agitator, means for damming up the specifically lighter liquid before withdrawal from the chamber at the top of same and for damming up the specifically heavier liquid before withdrawal at the bottom of the chamber, and finally means for withdrawing the lighter and the heavier liquid from the chamber separately.

2. An apparatus for bringing into contact with each other liquids of different specific weight which are practically insoluble in each other, comprising a chamber provided at top and bottom with openings for introducing and withdrawing the liquids to be treated, a projection provided on the edge of the openings for withdrawing the liquids from the chamber which projects into the chamber in such a manner that before leaving the chamber the liquids are dammed up at the top and on the bottom of the chamber, an agitating element mounted in the chamber to rotate about a substantially vertical axis, means for rotating this agitator in the chamber, said agitator provided with openings proceeding from the upper side and lower side of the agitator and ending substantially at the periphery of same, the mouths of the channels on the upper and lower sides of the agitator being nearer to the axis of same than the mouths of the channels at the periphery of said agitator.

3. An apparatus for bringing into contact with each other liquids of different specific weight which are practically insoluble in one another, comprising a chamber provided at top and bottom with an opening on the edge of which a projection extending into the chamber is provided in such a manner that one liquid is dammed up at the bottom and the other beneath the roof of the chamber before the liquids leave the chamber, the projection on the edge of each opening being provided with an aperture to which a tube attachment projecting substantially horizontally into the opening is connected, the lower opening serving to introduce the specifically lighter and withdraw the specifically heavier liquid, and the upper opening serving to introduce the heavier and withdraw the lighter liquid, an agitating element mounted in the chamber to rotate about a substantially vertical axis, means for rotating said agitator in the chamber, said agitator provided with channels proceeding from the upper side and lower side of same and ending substantially at the periphery of said agitator, the mouths of the channels on the upper and lower sides of the agitator being nearer to the axis of same than the mouths of the channels at the periphery of said agitator.

4. An apparatus for bringing into contact with each other liquids of different specific weight which are practically insoluble in each other, comprising a chamber, an agitating element mounted therein to rotate about a substantially vertical axis, means for rotating said agitator in the chamber, said agitator provided with channels proceeding from the upper side and lower side of same and ending substantially at the periphery of said agitator, the mouths of the channels on the upper and lower side being nearer the axis of the agitator than the mouths of the channels at the periphery of said agitator, means for introducing the specifically lighter and the specifically heavier liquid into the chamber beneath and above the agitator, and means for withdrawing the specifically lighter liquid from the chamber at the top and the heavier liquid at the bottom of the chamber, said chamber being finally provided with means adapted to hinder the rotational movement of the liquid inside the chamber when the agitator is rotated.

5. An apparatus as set forth in claim 4, wherein inwardly projecting, substantially vertical ribs are provided on the side walls of the chamber for hindering the rotational movement of the liquid.

6. An apparatus as set forth in claim 4 wherein the chanels proceeding from the upper side and the lower side of the agitating element terminate in a common opening at the periphery of the said agitating element.

7. An apparatus for bringing into contact with one another liquids of different specific weight which are practically insoluble in each other, comprising a plurality of chambers each of which is provided at top and bottom with an opening on the edge of which is provided a projection extending into the chamber in such manner that one liquid is dammed up at the bottom and the other beneath the roof of the chamber before the liquids leave the chamber, the projection on the edge of each opening being provided with an aperture to which a tube attachment projecting substantially horizontally into the opening is connected, the lower opening serving to introduce the specifically lighter and withdraw the specifically heavier liquid, and the upper opening serving to introduce the heavier and withdraw the lighter liquid, an agitating element mounted in each chamber to rotate about a substantially vertical axis, means for rotating the agitators in said chamber, said agitators being provided with channels proceeding from the upper side and lower side of the same and ending substantially at their peripheries, the mouths of the channels on the upper and lower sides of the agitators being nearer to the axis of the agitators than the mouths of the channels at the peripheries of the agitators, and the lower and upper openings of the chambers being adapted for the passing of the liquids under treatment from one chamber into the other.

8. An apparatus for bringing into contact with one another liquids of different specific weight which are practically insoluble in each other, comprising a plurality of chambers each of which is provided at top and bottom with an opening on the edge of which is provided a projection extending into the chamber in such manner that one liquid is dammed up at the bottom and the other beneath the roof of the chamber before the liquids leave the chamber, the projection on the edge of each opening being provided with an aperture to which a tube attachment projecting substantially horizontally into the opening is connected, the lower opening serving to introduce the specifically lighter and withdraw the specifically heavier liquid, and the upper opening serving to introduce the heavier and withdraw the lighter liquid, an agitating element mounted in each chamber to rotate about a substantially vertical axis, means for rotating the agitators in said chamber, said agitators being provided with channels proceeding from the upper side and lower side of the same and ending substantially at their peripheries, the mouths of the channels on the upper and lower sides of the agitators being nearer to the axis of the agitators than the mouths of the channels at the peripheries of the agitators, and the lower and upper openings of the chambers being adapted for the passing of the liquids under treatment from one chamber into the other, said chambers being arranged one above the other in such a manner that the liquids can flow from one chamber into the other without the use of pumps or the like.

9. An apparatus as claimed in claim 4 wherein inwardly projecting substantially vertical ribs are provided on the side walls of the chamber and downwardly and upwardly projecting ribs are also provided on the top and bottom, respectively, of the chamber for hindering the rotational movement of the liquid.

HEINRICH SCHÖNEBORN.